Sept. 23, 1969       G. HIRS ET AL       3,468,778
ELECTROSTATIC LIQUID FILTER
Filed Jan. 14, 1966       2 Sheets-Sheet 1

Inventors
GENE HIRS
By KENNETH W. MACKENZIE
ALFRED H. STEIN
Wilson, Settle, Batchelder
ATT'YS.   & Craig Inventors
GENE HIRS
KENNETH W. MACKENZIE
ALFRED H. STEIN
By Wilson, Settle, Batchelder
ATT'YS. & Craig United States Patent Office 3,468,778
Patented Sept. 23, 1969

3,468,778
ELECTROSTATIC LIQUID FILTER
Gene Hirs, Birmingham, Kenneth W. MacKenzie, Detroit, and Alfred H. Stein, Southfield, Mich., assignors to Hydromation Engineering Company, Livonia, Mich., a corporation of Michigan
Filed Jan. 14, 1966, Ser. No. 520,689
Int. Cl. B01d *13/02;* B01k *3/04*
U.S. Cl. 204—180                               6 Claims

ABSTRACT OF THE DISCLOSURE

A method and apparatus for electrostatically removing solids from a suspension of solids in a liquid of high dielectric strength. The method includes steps of flowing the solid-liquid dispersion along a flow path at least one boundary of which is defined by an elongated electrode, disposing in the flow path a plurality of point source electrodes spaced from each other along the flow path and also spaced from the elongated electrode, and applying an electric field to the electrodes to create a series of regions of high field strength through which particles in the dispersion pass successively, with the particles being displaced by the field toward the elongated electrode. Solid material is removed from the elongated electrode as by vibrating that electrode in the solid-liquid dispersion or another liquid. The apparatus includes a liquid container, at least one elongated electrode in the container having an extended surface, a plurality of point source electrodes in the container spaced in serial relation with each other and substantially equidistant from the extended surface of the elongated electrode, means for producing an electric field between each point source electrode and the extended surface electrode, and an inlet and an outlet for the container for producing a flow of liquid in contact with the extended surface and serially contacting the point source electrodes to pass the liquid through successive regions of high field strength and cause solids to deposit from the liquid on the extended surface. The point source electrodes are preferably wires, and the elongated electrode is preferably a plate. A plurality of parallel plates and wires may be provided.

---

This invention relates to liquid filters, and, in particular, to a liquid filter which electrostatically removes solids from a suspension of solids in a liquid.

Some types of solid-liquid suspensions cannot be filtered effectively with known liquid filters; for example, oil containing very finely divided particles, such as those resulting from electric discharge machining. Other operations where such fine suspensions of solids in liquids occur are in honing and lapping operations. It has been found that the flow rate through the filter media is so small as to make the filtering ineffective or uneconomical. In some cases, the dirt particles are so fine as to make ordinary filtration impossible.

It has been found by applicant that what is needed is a liquid filtration process and apparatus which does not depend on liquid flow through a filter media, and which can be easily renewed from time to time by removing deposited solid materials. This has been accomplished in accordance with the invention by exposing a first electrode having an extended surface and a number of second point source electrodes to the suspension as it flows along a flow path in contact with the electrodes, the electrodes being at potentials which create an effective electric field between each point source electrode and the extended surface. Since the liquid in which the particles are suspended, e.g. oil, has a high dielectric strength, a great potential difference, e.g. up to 25,000 volts, can be employed. In this way the flowing liquid solid suspension encounters successive regions of high field strength which causes the particles to migrate to the extended surface electrode and deposit on that surface. The cell can be renewed periodically by removing the solids from the extended surface area, and this may be done, for example, by vibrating the electrodes in a suitable liquid.

It is an object of this invention to provide a liquid filter capable of removing solids from solid-liquid suspensions having very fine solid particles dispersed in the liquid.

Another object of the invention is to provide an electric liquid filter which can be easily renewed from time to time.

A further object of the invention is to provide an electric filtering process capable of economically removing extremely fine particles from solid-liquid suspension.

A further object of the invention is to electrically filter solid-liquid suspensions by exposing a plurality of point source electrodes and an extended surface area electrode to the suspension as it flows along a flow path in contact with the electrodes, the electrodes being arranged and energized such that the flowing suspension encounters successive regions of high field intensity which cause solids to deposit on the extended surface.

Another object of the invention is to provide a method of electric filtration or precipitation of solids and of removing solids from an extended area electrode on which they have been deposited.

Other objects of this invention will appear in the following description and appended claims, reference being had to the accompanying drawings forming a part of this specification wherein like reference characters designate corresponding parts in the several views.

The invention is illustrated in the accompanying drawings in which.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
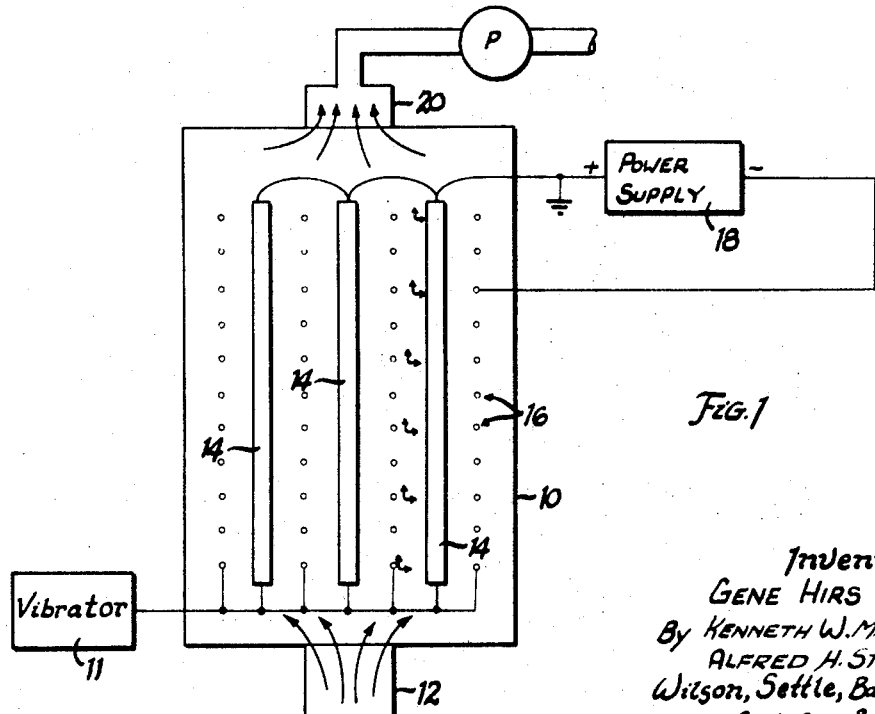
FIGURE 1 is a schematic view of a liquid oil filter in accordance with the invention, and illustrates the steps of the process of the invention.

Referring first to FIGURE 1, the solid-liquid suspension to be filtered flows into a container 10 through an inlet 12 and then divides into parallel flow paths between and around plate electrodes 14 provided in the container. The plate electrodes are parallel to and spaced from each other, as shown in FIGURE 1, and there are rows of point or linear source electrodes 16 on both sides of each plate electrode 14. Each row of point source electrodes consists of a plurality of wires spaced along one of the parallel liquid flow paths and extending across the flow path, such that the liquid flowing through the container contacts the wires in a serial sequence. The "point source" electrodes can be more accurately defined as linear electrodes. After passing between the electrodes, the liquid leaves the container 10 via an outlet 20.

An electric field is applied between the point source electrodes 16 and the plate electrodes adjacent thereto, for example as shown schematically in FIGURE 1 wherein the positive terminal of power supply 18 is connected to the plate electrodes 14 which are grounded, and the point source electrodes are connected to the negative terminal of the power supply. The best results have been obtained by charging the point source electrodes negatively relative to the plate electrodes, as in FIGURE 1, but it will be understood that they could be charged positively, if desired. Ordinarily, a very strong field is applied to the electrodes, say 25,000 volts. In spite of the high strength of the field, no shorting has been observed, even after an appreciably thick coating has built up on the electrodes. This result is at least partly due to the high dielectric strength of the liquid being filtered.

It is possible that the particles do not receive a net charge, but rather become dipoles which align with the field and migrate to the plate electrodes 14 where they deposit on the extended surface of these electrodes. Whether the particles receive a net charge or simply act as dipoles, the field is effective to cause solid material in the solid-liquid suspension to deposit on the electrode plates. There may be some deposition of solids on the wires 16, but less material deposits on the wires because they have such a small surface area compared to the plates 14.

Figures 3, 5:
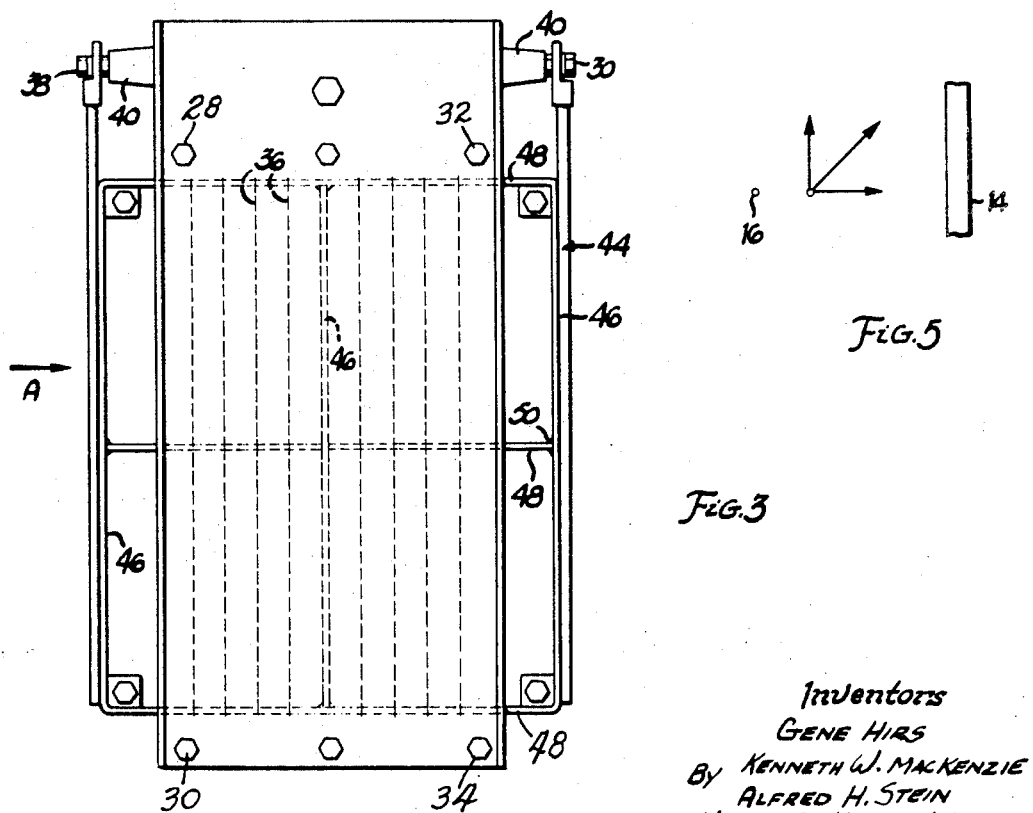
FIGURE 3 is an end view of the filter of FIGURE 2.
FIGURE 5 is a vector diagram illustrating the forces which act on a particle in the filter.

The manner in which a given particle migrates to a plate electrode in stages as it passes a series of point source electrodes has been illustrated in FIGURES 1 and 5 by means of vectors. As a particle flows past the point electrode nearest inlet 12, a force acting longitudinally of its flow path is exerted on it by the pump which causes the suspension to flow, and another force due to the field acts on it transversely of the main flow path. These forces, represented by arrows in FIGURES 1 and 5, act on the particle with maximum effect each time it passes one of the point source electrodes. The resultant force, represented by a diagonal arrow in FIGURE 5, is directed toward the plate electrode 14 and so causes the particle to move toward the plate. Thus, the particle is subjected to a pulse each time it approaches a point electrode and this pulse impels the particle toward the electrode 14. Since the particle keeps moving ever closer to plate electrode 14 as it passes through the container, it finally deposits on the plate 14. In this manner a coating of such particles builds up on each of the plate electrodes. Of course, the accretion of particles onto a specific portion of the plate electrode 14 is a statistical phenomenon, which has been utilized in the present invention, as indicated by the fact that an amazingly uniform layer of particles deposits over the entire surface of the electrode 14.

Figure 2:
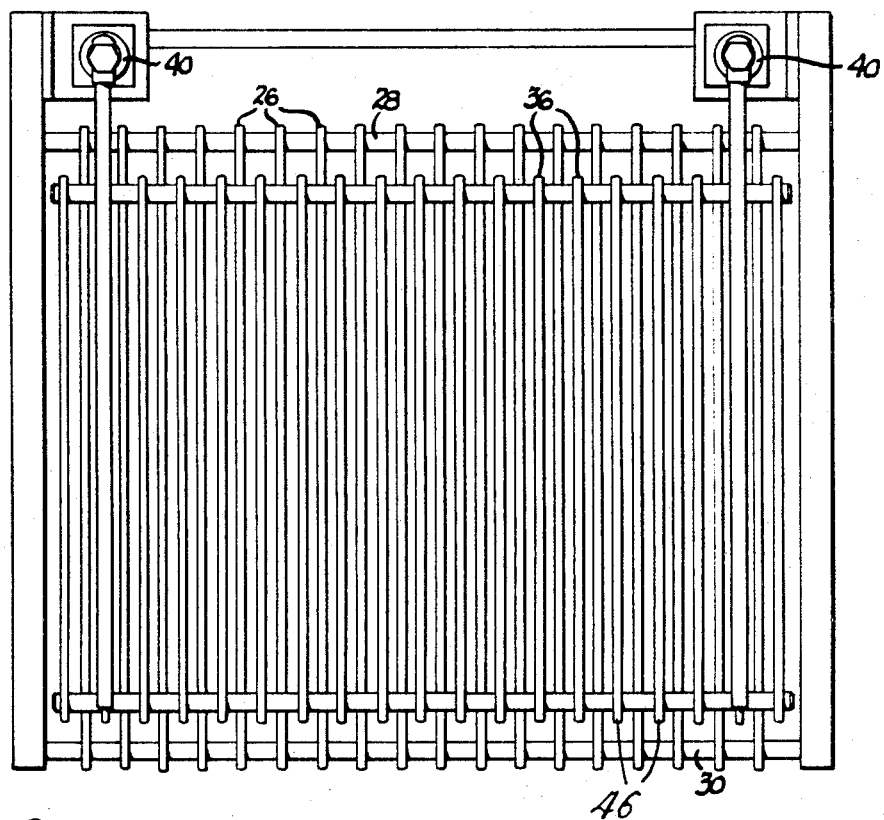
FIGURE 2 is a side elevational view of an electric liquid filter in accordance with the invention.
Figure 4:
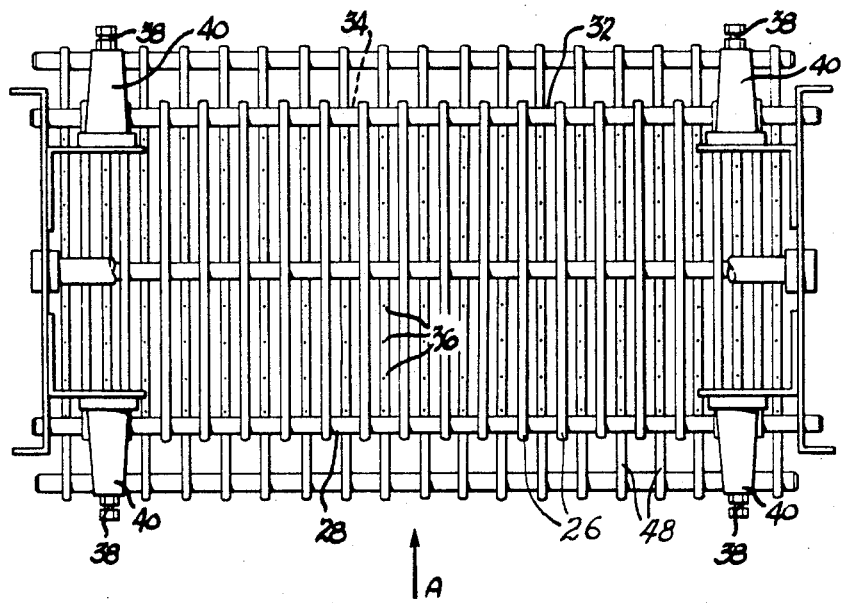
FIGURE 4 is a top plan view of the electric liquid filter of FIGURE 2.

FIGURES 2, 3 and 4 show the structure of an electric liquid filter in accordance with one embodiment of the invention. The container is omitted from these views for the sake of clarity. A number of electrode plates 26 are mounted on a frame composed of rods 28, 30, 32 and 34, the latter rod not being visible in these views. Between each adjacent pair of plates 26 there is a row of wires 36, and there are nineteen rows of wires in the embodiment illustrated in the drawings. Thus, each adjacent pair of plates has a row of wires between them and there are enough pairs of plates and rows of wires to provide a desired number of parallel liquid flow paths.

Each row of wires 36 is carried by a frame 44 (FIGURE 3) comprised of three vertically extending rods 46, and three horizontally extending rods 48 welded, as at 50, to make a square frame with internal cross braces. Wires 36 are wound about the horizontal rods 48 and strung between these same rods to form a row of wires, as described previously.

Electrical connections are made to the wires at terminals 38 which are electrically isolated from the plates by insulators 40. It may be seen from the drawings that the insulators 40 and the terminals 38 are all provided at the top of the filtration unit and thus may be maintained above the maximum liquid level of the container in which the electrodes are placed. The general direction of liquid flow is indicated by arrows A in FIGURES 3 and 4.

When the coating on the plate electrodes 14 builds up to an excessive thickness, the filter is renewed by vibrating the plate electrodes while they are immersed in oil. This may be done while the filter stays on line in a fully operating condition, but from time to time the unit may be taken off line and renewed. For this purpose, the container 10 (FIGURE 1) may have a drain outlet at its bottom side. A vibrator unit 11 is connected to the plate and ionizer electrodes as shown schematically in FIGURE 1. The liquid-solid suspension is partially drained from container 10, but the plates 14 and wires 16 remain immersed. The electrodes are then vibrated for as long as needed to clean them, and in practice they may be renewed in a relatively short time. Particles removed from the plates settle to the bottom of the container. After renewing the electrodes, the remaining suspension may be drained out of the container before it is placed back on line.

The filter and filtration process of the invention have proved to be practical for filtering liquids containing extremely fine particles which would clog ordinary filter media quite rapidly. Thus, the invention fills a need which has existed for some time in the art of filtering liquids.

We claim:
1. A method of electrically removing solids from a hydrocarbon liquid of high dielectric strength having solid material dispersed and suspended therein, said method comprising flowing said solid-liquid suspension along a flow path, exposing an extended surface of one electrode and also exposing a series of linear source electrodes spaced along and from said surface to said solid-liquid suspension as it flows along said flow path in contact with said electrodes, applying an electric field between each said linear source electrode and said extended surface electrode, said field being inherently non-uniform and depositing solid material from said flowing suspension on to said extended surface.

2. The method of claim 1 wherein the deposited solid material is removed by contacting said extended electrode with liquid and agitating to remove deposited material from said surface.

3. The method of claim 2 wherein said agitation is done by vibrating said extended electrode in said liquid.

4. The method of claim 1 wherein said suspension flows through a plurality of parallel flow paths between a plurality of plate electrodes parallel and substantially coextensive with each other, each adjacent pair of plate electrodes having a row of electrode wires between the same.

5. A method of electrostaticaly removing solid particles from a hydrocarbon liquid of high dielectric strength in which the particles are dispersed, comprising
   (1) flowing the solid-liquid dispersion along a plurality of parallel flow paths defined between parallel elongated electrodes of appreciable extent,
   (2) disposing in each of said flow paths a plurality of linear source electrodes spaced from one another along the flow path and substantially uniformly spaced from the adjacent elongated electrodes,
   (3) applying an electric field to said electrodes in which field the elongated electrodes are of a first polarity and said linear source electrodes are of reverse polarity, thus creating a series of regions of high field strength adjacent the linear source electrodes and through which particles in said dispersion pass successively as said dispersion flows in said flow path,
   (4) by passing through such a region each such particle being displaced toward its respecting elongated electrode, and (5) periodically agitating the liquid to remove the particles adhering to said elongated electrodes.

6. A method as defined in claim 5 wherein step (5) is carried out by vibrating at least one of said elongated electrodes.

References Cited

UNITED STATES PATENTS

| | | | |
|---|---|---|---|
| 2,542,054 | 2/1951 | Penney et al. | 204—299 |
| 2,588,111 | 3/1952 | Hanneman | 183—7 |
| 2,672,948 | 3/1954 | Penney | 183—7 |

FOREIGN PATENTS 478,230  1/1938  Great Britain.

OTHER REFERENCES

Pohl, "Nonuniform Electric Fields," Scientific Amer., vol. 203, No. 6, December 1960, pp. 107, 108, 110.

JOHN H. MACK, Primary Examiner

A. C. PRESCOTT, Assistant Examiner

U.S. Cl. X.R.

204—188, 299, 302